J. H. CARY AND J. D. McMURRY.
COMBINATION DRAFT COLLAR AND HAME.
APPLICATION FILED MAY 13, 1918.
1,331,454.
Patented Feb. 17, 1920.
2 SHEETS—SHEET 2.
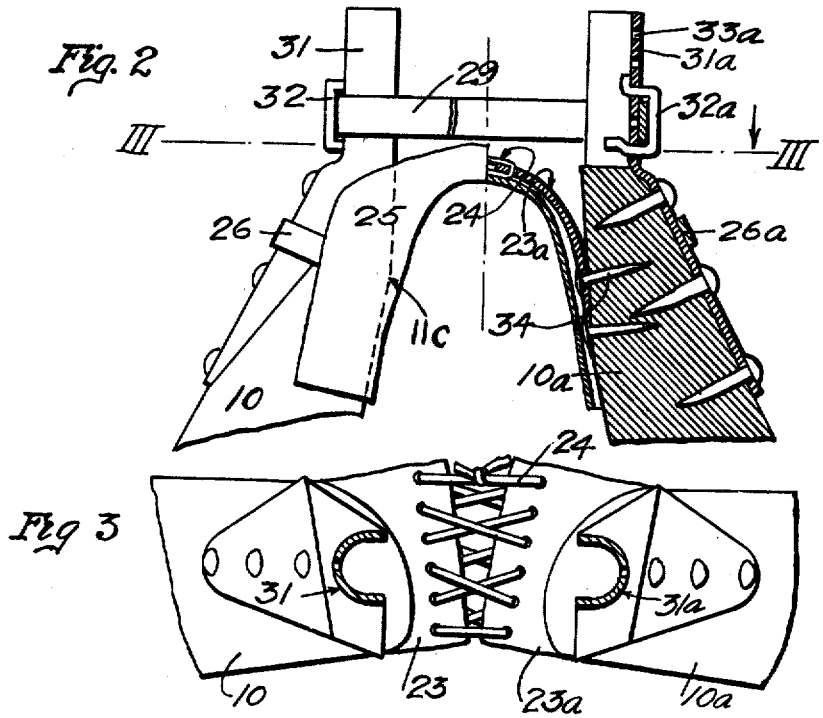
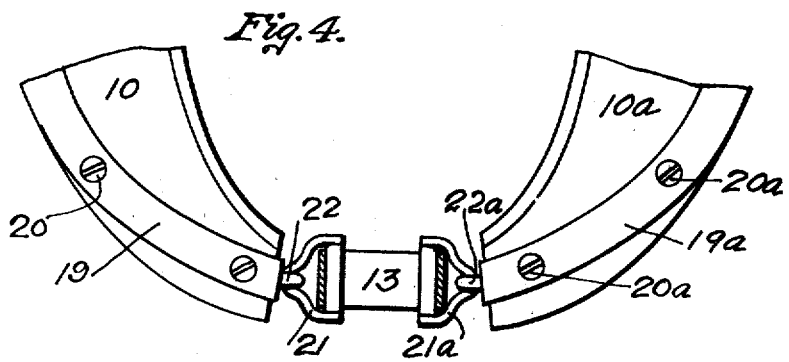
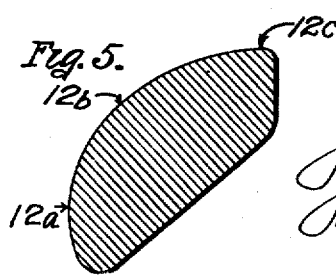

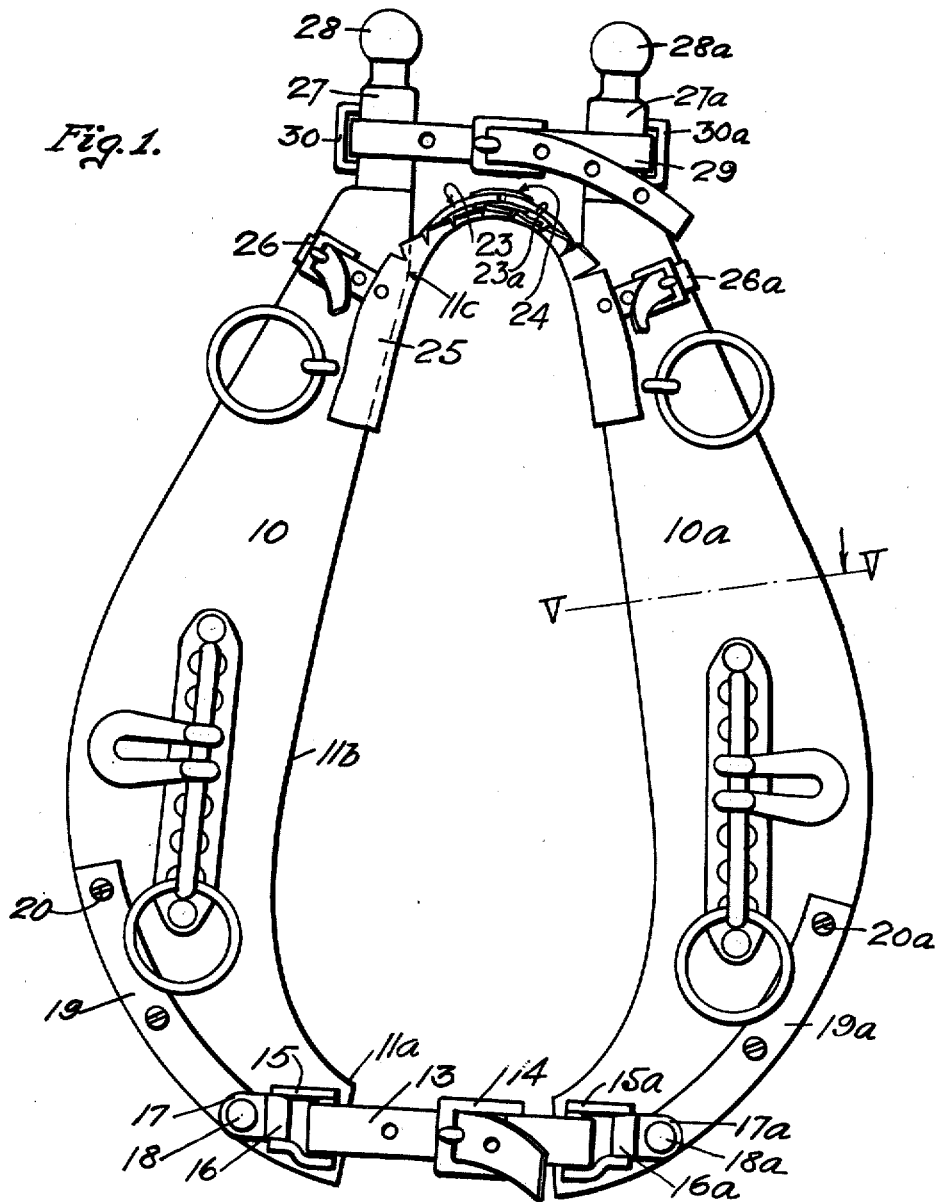

UNITED STATES PATENT OFFICE.

JAMES H. CARY AND JOHN D. McMURRY, OF MEMPHIS, TENNESSEE, ASSIGNORS OF ONE-THIRD TO JOHN E. CARY, OF MEMPHIS, TENNESSEE.

COMBINATION DRAFT COLLAR AND HAME.

1,331,454.    Specification of Letters Patent.    Patented Feb. 17, 1920.

Application filed May 13, 1918. Serial No. 234,145.

*To all whom it may concern:*

Be it known that we, JAMES H. CARY and JOHN D. MCMURRY, both citizens of the United States, residing at Memphis, county of Shelby, State of Tennessee, have invented certain new and useful Improvements in Combination Draft Collars and Hames, of of which the following is a full, clear, and exact description, such as will enable others skilled in the art to make and use same.

Our invention relates especially to improvements in a joint collar and hame of rigid materials, whereby the draft or pull on the collar and hame is successfully transferred to the shoulder of the mule or horse on which the article is used. It further relates to improvements whereby motion of the two sides of the collar and hame is permitted to allow it to adjust itself to the movement of the shoulders of the animal on which it is used and in the method of supporting the collar independently of the upper draft straps.

The objects of our invention are to accomplish these purposes in a simple, expeditious, and reliable manner. We accomplish these objects as will be more fully hereinafter set forth in the drawings, specifications and plans.

In the drawings.

Figure 1 is front elevation of our improved collar and hame in its preferred form.

Fig. 2 is a half section, half elevation of the upper end of our collar and hame, showing modified form of same.

Fig. 3 is a sectional plan view taken on the line III—III of Fig. 2 looking down.

Fig. 4 is a front elevation of the lower end of the collar and hame showing modified form of the former.

Fig. 5 is a section on the line V—V of Fig. 1.

Referring now to the drawings in which the various parts are indicated by numerals, each numeral indicating the same part in all of the views.

The collar consists primarily of two similar halves 10—10$^a$, preferably made of wood, or if not of wood, of fiber, hard paper, or metal, it being essential however, that they be made of some rigid, non-distortable material. These halves are especially shaped to fit the curve of the animal's neck. This shaping occurs in two directions substantially at right angles to each other. It is our belief that the definite shape which we have given to this article employs certain principles and ways of carrying same out, which are novel and not heretofore used.

The inner vertical curve, or more specifically the inner curve of the vertical projection of each of the halves 10—10$^a$ of the collar and hame as indicated by the line 11$^a$—11$^b$ 11$^c$ of the drawing Fig. 1 is one of increasing radii, beginning with the least radius at the point 11$^a$ and increasing in constant ratio to the point 11$^b$, substantially two-fifths of the distance from the bottom 11$^a$ to the top of the collar. From the point 11$^b$ to the point 11$^c$ no fixed curve is used. Above 11$^b$ the curve varies from practically a straight line in the case of a collar for a mule to a curve of long, but finite, radius in the case of one for a horse. At the point 11$^c$ also, which point is near the top of the collar, this curve stops abruptly and above this point the inner line of the halves diverges sharply outward from the curve if produced so that above the point 11$^c$ the inner lines of the halves are substantially parallel.

The shape of the collar at right angles to the inner vertical curve is shown more clearly in Fig. 5, which is a typical section through the collar on a plane at right angles to the said curve 11$^a$—11$^b$, or to be more exact, to a tangent to this curve at the point where the plane intersects same. This cross section, indicated by the curved line 12$^a$, 12$^b$, 12$^c$ is also a curve increasing in radius from the point 12$^a$ to the point 12$^c$. At 12$^c$ this curve is substantially tangent to a line connecting 12$^c$ on the back of the right half 10$^a$ of the collar to a similar point on the left half 10, and the curve at the point 12$^a$ is tangent to a line substantially at right angles to this first mentioned line. In other words, this collar is a collar having a permanently formed cross section in any plane at right angles to a tangent to the inner vertical curve of increasing radii beginning at a point in said inner vertical curve and increasing in radius to a point in a line tangent to the back of the two halves of the collar in said plane.

At the lower end the two halves 10—10$^a$ of the collar are connected by an adjustable strap 13 either tied or fastened by a buckle 14 as shown. In the preferred form of our invention shown in Fig. 1, this strap passes through a swinging loop 15 on the half 10 and a similar loop 15ª on the half 10ª, which loops are hinged at 16—16ª in clips 17—17ª fastened to the face of the halves 10—10ª by rivets 18—18ª around which they are free to swing, thus giving the loop movement both in the vertical plane of the collar and at right angles thereto, and thereby attaching it to said collar with a universal attachment. 19—19ª are reinforcing straps of metal strengthening the face of the two halves 10—10ª respectively and fastened to same by screws 20—20ª. In Fig. 4 we show a modified form in which loops 21—21ª are fastened to the halves 10—10ª respectively by staples 22—22ª. In this view the front half of the strap 13 is shown cut away so that the loop may be more clearly seen. In either case the strap has free horizontal movement around the front of the loop 15 (or 21 as the case may be) and the loop itself has free vertical movement in a plane at right angles to this strap so that the strap will lie flat and adjust itself to any movements that the halves of the collar may make as the animal's shoulders move. At the upper end the collar is supported by flat straps 23—23ª of substantially the width of the upper end of the collar fastened to the two halves 10—10ª respectively, at the point 11ᶜ, and laced together with a continuous lace 24. This lacing while holding the two straps together permits them to adjust themselves so that the halves of the collar may conform to the animal's neck and the straps and lacing form a support for the weight of the collar. This support extends above the point 11ᶜ so that where it rests on the animal's neck it is free from side pressure from the rigid halves of the collar, and is a free and flexible support for same.

25 is a loose shield or guard of leather which is loosely fastened to the collar by means of straps 26—26ª and which serves to prevent the lace or the supporting straps from cutting the animal's neck. Immediately above this support and in the center of the two halves 10—10ª horns 27—27ª are extended upward above the collar proper, those shown in Fig. 1 being formed (preferably of circular cross section) out of a part of the wood of the collar itself. They may be finished with ornamental balls 28—28ª if desired. Around these horns is placed a strap 29 which serves as a draft strap or tug for the upper part of the collar and takes the strain incidental to the pull. This strap may be held in place by staples 30—30ª driven into the horns 27—27ª respectively. If desired, holes may be bored to receive the legs of the staples, and they may be made adjustable to various positions. Equivalent means not shown may be substituted to retain this trap in position.

In Figs. 2 and 3 we show horns 31—31ª of modified form, which in this case are stamped out of sheet metal shaped to embrace the outer surface of the upper ends of the two collar halves 10—10ª and extend upward as did the wooden horns. The plan view disclosed in Fig. 3 shows the central location of these horns with reference to the end of the collar. In this case a strap 29 is shown held by staples 32—32ª, fitted in holes 33ª. The shape of the staples is such that they lock into the horns when forced into place but they may be easily removed and adjusted to an additional set of holes if so desired. This view also shows the method of attaching the strap 23ª to the collar 10ª by means of flat head nails 34 driven directly into the wood at the point 11ᶜ near the end of the collar.

While we prefer to cut the collar away at 11ᶜ as shown, this may be deviated from if we should so desire and the curve 11ᵇ—11ᶜ be produced unbroken to the top.

It will be seen from the foregoing that, by reason of the careful shaping of the collar both as to vertical section and cross section, by reason of the loops at the bottom end of the collar mounted to provide movement in any direction and to permit the collar to adjust itself at this point to the movement of the animal's shoulders and by reason of the draft strap at the top of the collar independent of the support strap, that this collar though of rigid material is adapted to conform and adjust itself to the animal's shoulders with the minimum of discomfort and therefore with the maximum of efficiency.

Having now fully described our invention what we claim and desire to secure by Letters Patent in the United States is,

In a combination collar and hame, two oppositely disposed permanently formed halves and means for fastening the lower ends of the same, of a top fastening comprising a flexible supporting strap of substantial width attached to each of the said halves, a plurality of oppositely disposed holes in the said straps adjacent the abutting ends of the same, a continuous lacing passing through the said holes to provide means for laterally adjusting the halves and permitting relative self-adjustment of the straps, an integral horn extending upward from each of the said halves, and an independent draft strap connecting the said horns.

In testimony whereof we have hereunto set our names.

JAMES H. CARY.
JOHN D. McMURRY.

Witnesses:
J. A. HEARD,
W. R. SIMS.